July 17, 1962  C. F. BALDWIN  3,045,225
SLEEP PREVENTING DEVICE
Filed July 28, 1958
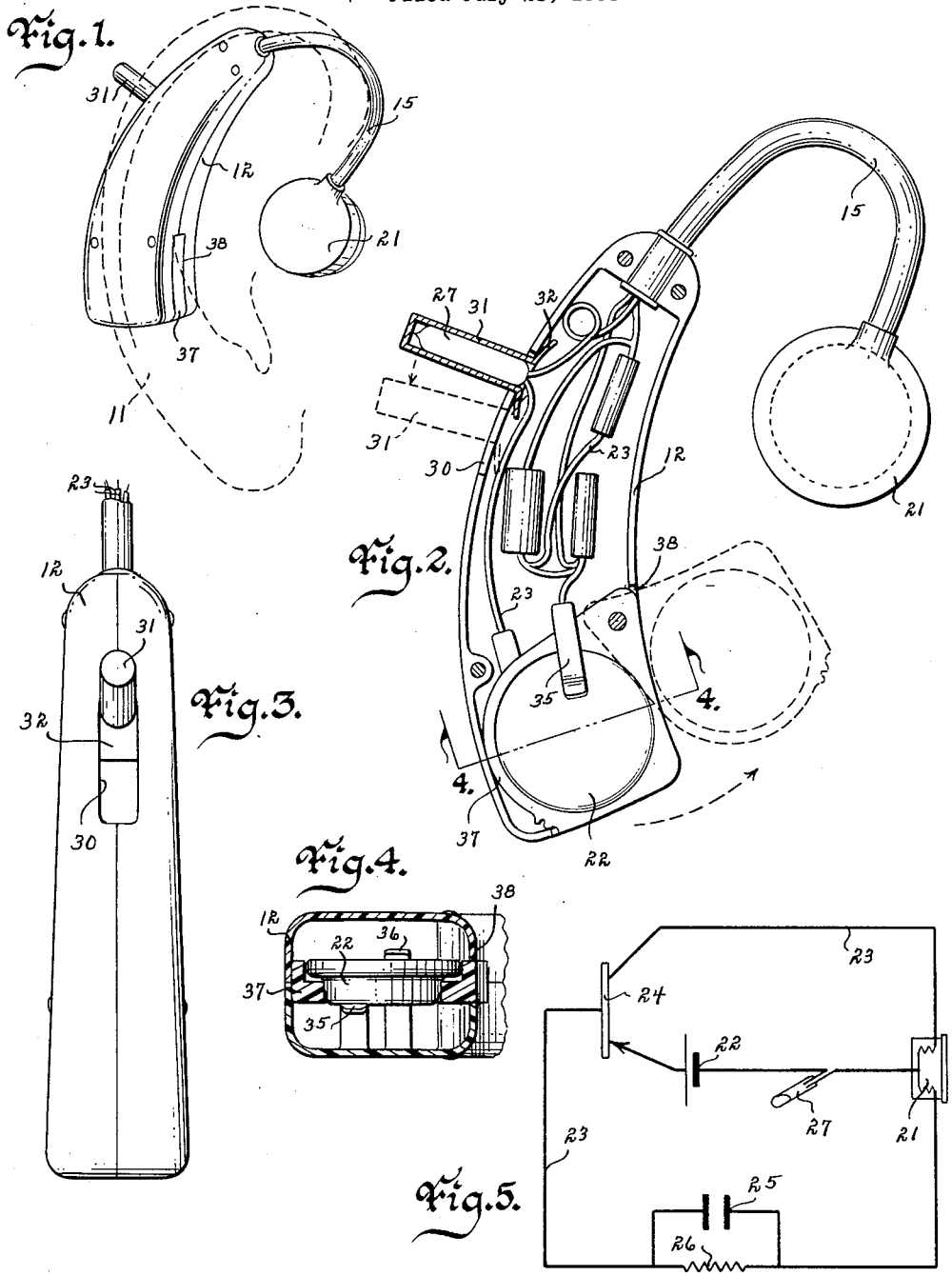
Witness
Edward P. Seeley
Inventor
Carroll F. Baldwin
by M. Talbert Dick
Attorney United States Patent Office 3,045,225
Patented July 17, 1962

3,045,225
SLEEP PREVENTING DEVICE
Carroll F. Baldwin, 4504 Fleur Drive,
Des Moines, Iowa
Filed July 28, 1958, Ser. No. 751,483
7 Claims. (Cl. 340—279)

This invention relates to an audible signalling means and more particularly to a device for preventing vehicle drivers from falling asleep at the steering wheel of a vehicle. The present application is an improvement over the device disclosed in my application for United States Letters Patent Serial No. 537,936, filed October 3, 1955, on a Device for Preventing Drivers From Falling Asleep, now abandoned.

One of the hazards of driving vehicles such as automobiles, trucks, busses, airplanes, and like, is that of accidentally falling asleep thereby endangering lives and property. This is particularly true in piloting airplanes and driving trucks. In the matter of airplane piloting, there is no possibility of parking and taking a nap such as might be possible with a land vehicle. Also in an airplane there is no "road path" watching and the uniform constant drone of the engine or engines is most conducive to drowsiness. In the matter of driving a truck a great deal of long hauls are at night. While most companies operating a fleet of trucks desire that when a driver gets sleepy, he stop and sleep for a half hour or hour, the trouble is, however, that the driver usually gets drowsy between towns, pulls to the side of the road, goes to sleep, and doesn't awaken until many hours thereafter. If, on the other hand, the driver can keep awake until he reaches a town, he will not only have a safe place to park the vehicle, but most town night marshals will waken him on their next trip around, as a courtesy.

Therefore, one of the principal objects of my invention is to provide a noise making device that will automatically sound a warning when the head of the user nods forwardly.

A further object of this invention is to provide a sleep alarm device that is of one portable unit and worn on the head of one liable to fall asleep while driving a vehicle.

More specifically the object of my invention is to provide a sleep inhibiting device that is compact, light, and may be worn attached to one ear of the user.

A still further object of this invention is to provide an anti-sleep device that may be easily and quickly adjusted as to the degree of head tilt necessary to place the device into alarm operation.

Still further objects of my invention are to provide a head worn sleep awakening device for vehicle drivers that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective view of my unit in use in the ear of a user;

FIG. 2 is an enlarged cross sectional view of the device;

FIG. 3 is an enlarged rear end view of the housing portion of the device;

FIG. 4 is a cross sectional view of the unit taken on line 4—4 of FIG. 2; and

FIG. 5 is a diagrammatical electrical wiring plan of the device with parts shown in symbol.

As herebefore indicated my alarm device is worn around one ear of the user as distinguished from head sets having a head engaging band for supporting the electrical unit adjacent an ear or ears.

With my unit in place on a user, there is a housing that hangs back of the ear 11, and an attached sound button that covers the ear opening as shown in FIG. 1. The housing is designated by the numeral 12 and is preferably of plastic such as polyethylene plastic. This material has the characteristic of being flexible and resilient. The housing 12 is elongated, extends downwardly and forwardly in a curved path and increases in diameter as it extends downwardly as shown in FIG. 2. As before indicated this housing extends back of the ear. The numeral 15 designates a tubular conduit communicating at one end with the inside top area of the housing 12. The numeral 21 designates the sound button on the free end of the tubular conduit. The tubular conduit extends in a curved path first upwardly, then forwardly, and then downwardly. In use, the tubular conduit hooks over the ear, and then passes to the front of the ear in order to hold the sound button 16 adjacent the ear opening. The sound button may be any suitable ordinary electrically operated audible phone capable of producing a high pitched tone when electrically connected to a suitable source of electric energy. Any type electric battery may be used, but I prefer the small button type mercury cell type designated by the numeral 22. The numeral 23 designates the electric circuit imposed in which is the audio phone 21 and battery 22, as shown in FIG. 5. Also imposed in the circuit is the transistor 24, condenser 25, and the resistor 26. The numeral 27 designates a mercury switch imposed in the circuit between the battery and one contact of the phone. All of the parts 22, 24, 25 and 26 and the circuit 23 are inside the housing, except that part of it that extends through the conduit 15 to the sound button. Obviously, if the mercury of the mercury switch is contacting both of the internal contact points of the switch, the circuit will be completed and the sound button will be actuated. If the mercury switch is in a position not connecting the two switch contact points, then the circuit will be broken and the sound button will be silent. My invention, of course, is to so adjustably locate the mercury switch that when the head of the user is upright, the circuit is broken and when the head of the user falls forwardly such as happens when sleepy, the circuit will be completed and the sound button will be electrically actuated, thus warning and awakening the user. To accomplish this adjustable mounting of the mercury switch, I provide a vertical slot opening 30 in the upper back side of the housing 12. This back side of the housing extends downwardly and rearwardly as shown in FIG. 2. The numeral 31 designates a cylinder housing having its forward end extending through the slot 30. This housing extends radially from the housing 12 forming a handle portion and a housing for the mercury switch. A shoe retainer flange 32 is on its inner end and inside the housing 12 for preventing its withdrawal from the slot 30.

The contact points of the mercury switch are at the inner end of the cylinder housing. By this arrangement, and due to the curvature of the upper rear side of the housing 12, the lateral manual sliding of the cylinder housing in the slot 30 will change the position or angle of the cylinder housing relatively to the horizontal. Obviously the higher the switch is placed the less forward movement of the head will be necessary to close the switch points and sound the alarm. In use, the device is placed on the head, and with the head held upright, the lever cylinder housing is slid downwardly until the circuit is broken. Different desires and different shaped heads will require different adjustments.

Another feature of my device is my method of making battery changes easy and rapid. The numerals 35 and 36 designate the two electrical spring terminals for electrically contacting the two sides, respectively, of the battery. The edge of the battery, however, is detachably held in a ring cradle 37, hinged at one end to the housing 12. This cradle may be swung out through a slit 38 in the housing thereby exposing the battery for repair or replacement. After completing the battery problem, the cradle is swung back into the housing to bring the battery into electrical connection. When in such closed condition, the cradle closes the slit opening 38 as shown in FIG. 1.

In the use of my device, if the head of the user is tilted forwardly and downwardly (such as would happen if the user were to nod with oncoming sleep), the mercury in the switch would flow forwardly and downwardly by gravity, close the circuit and thereby cause the alarm means to function. This high pitched noise level from the audio phone will instantly awaken the nodding sleepy user of the device. Obviously, the degree of nod of the head to close the circuit will depend upon the position of rotation of the housing relative to the vertical. The moment the head of the user assumes an erect position, the circuit will be broken resulting in the silencing of the device. Thus, my device is automatic and when once adjusted requires no further attention except an occasional battery replacement.

My entire device is of light weight material and inasmuch as it only has one ear of the user for support, a hat, cap or like, may be worn without interference.

While I have described the device as particularly adapted as a safety device for vehicle drivers, it may be used under any condition where it is desirable or necessary to keep the user from falling asleep.

By making the housing of flexible resilient non-electrical conductive material such as polyethylene plastic, the same is comfortable in use and eliminates danger of short circuits and electrical shocks.

Some changes may be made in the construction and arrangement of my sleep preventing device without departing from the real spirit and purpose of my invention, and it is my intention to cover by my claims, any modified forms of structure or use of mechanical equivalents which may be reasonably included within their scope.

I claim:

1. In a sleep alarm device, a housing, a cable secured at one end to said housing, an electrical noise producing means on the other end of said cable; said housing having a vertically curved side and a vertical slot in said curved side, a cylinder housing having one end portion extending into said slot and laterally vertically slidable in said slot, electric circuit means for generating an electrical noise producing signal, said electric circuit means having said electrical noise producing means connected therein by said cable and including a gravity actuated switch supported by said housing, and a source of electrical energy.

2. In a sleep alarm device, a housing, a cable secured at one end to said housing, an electrical noise producing means on the other end of said cable; said housing having a vertically curved side and a vertical slot in said curved side, a cylinder housing having one end portion extending into said slot and laterally vertically slidable in said slot, a flange on the inner end of said cylinder housing for preventing its withdrawal from the slot in the side of said housing, electric circuit means for generating an electrical noise producing signal, said electric circuit means having said electrical noise producing means connected therein by said cable and including a gravity actuated switch supported by said housing, and a source of electrical energy.

3. In a sleep alarm device, a housing, a cable secured at one end to said housing, an electrical noise producing means on the other end of said cable; said housing having a vertically curved side and a vertical slot in said curved side, a cylinder housing having one end portion extending into said slot and laterally vertically slidable in said slot, electric circuit means for generating an electrical noise producing signal, said electric circuit means having said electrical noise producing means connected therein by said cable and including a gravity actuated switch supported by said housing and a source of electrical power; said housing being of polyethylene plastic.

4. In a sleep alarm device, a housing, a cable secured at one end to said housing, an electrical noise producing means on the other end of said cable; said housing having a vertically curved side and a vertical slot in said curved side, a cylinder housing having one end portion extending into said slot and laterally vertically slidable in said slot, electric circuit means for generating an electrical noise producing signal, said electric circuit means having said electrical noise producing means connected therein by said cable and including a gravity actuated switch supported by said housing and a source of electrical power; said housing being of flexible resilient non-electrical conductive material.

5. A sleep alarm device adapted to hang on a user's ear, said device comprising a housing adapted to be disposed adjacent the back of the user's ear, an electrical noise producing means, a supporting and connecting cable extending from said housing and carrying said electrical noise producing means whereby the same is adapted to be disposed in front of the user's ear in facing relation thereto, said housing having an opening therein, a battery support arm hinged to said housing for swinging movement through said opening, said arm having a battery receiving opening therein extending between opposed faces thereof, a battery disposed within said battery receiving opening, said battery having opposed contact faces exposed on opposite sides of said arm, a gravity actuated switch supported by said housing, a pair of contacts disposed within said housing in spaced apart relation for engagement of said opposed contact faces of said battery, circuit means for generating a noise producing electrical signal, said electrical noise producing means and said cable forming part of said circuit means, said circuit means having said gravity actuated switch and said contacts connected therein whereby to produce said signal only when said contacts engage said opposed contact faces of said battery, and said gravity actuated switch is actuated.

6. A sleep alarm device as defined in claim 5 wherein said circuit means comprises an oscillatory circuit including an electronic valve and resistance and capacitance means, and wherein said electronic valve and resistance and capacitance means are disposed in said housing.

7. A sleep alarm device comprising a housing, cable means secured at one end to said housing, an electrical noise producing means on the other end of said cable means, said housing having an opening, a battery holding frame hinged to said housing and capable of being swung in one direction through the opening of said housing and to a first position at least substantially within said housing, and swung in the other direction through said opening and to a second position outside said housing, a battery detachably mounted in said battery holding frame, an oscillator circuit for generating a noise producing electrical signal and including a gravity actuated switch, said oscillator circuit having said noise producing means connected therein by said cable means, and also including contacts adapted to engage said battery when said battery receiving frame is swung into said first position.

References Cited in the file of this patent

UNITED STATES PATENTS

| | | |
|---|---|---|
| D. 174,053 | Norris | Feb. 15, 1955 |
| 1,528,423 | Heyne | Mar. 3, 1925 |
| 2,344,014 | Allison | Mar. 14, 1944 |
| 2,705,529 | Bull et al. | Apr. 5, 1955 |
| 2,713,159 | Morrison | July 12, 1955 |
| 2,721,912 | Rutledge | Oct. 25, 1955 |
| 2,754,497 | Wolpert | July 10, 1956 |
| 2,882,348 | Erickson | Apr. 14, 1959 |
| 2,891,116 | Nichols | June 16, 1959 |
| 2,901,551 | Passow | Aug. 25, 1959 |

FOREIGN PATENTS

| | | |
|---|---|---|
| 716,445 | Great Britain | Oct. 6, 1954 |
| 210,888 | Australia | May 30, 1957 |